United States Patent
Holt et al.

(10) Patent No.: US 9,652,443 B2
(45) Date of Patent: May 16, 2017

(54) TIME-BASED VIEWING OF ELECTRONIC DOCUMENTS

(71) Applicant: Microsoft Technology Licensing, LLC, Redmond, WA (US)

(72) Inventors: Robert Richard Kenneth Holt, Woodinville, WA (US); Christopher N. Haddan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 698 days.

(21) Appl. No.: 13/901,155

(22) Filed: May 23, 2013

(65) Prior Publication Data

US 2013/0254653 A1 Sep. 26, 2013

Related U.S. Application Data

(63) Continuation of application No. 13/042,324, filed on Mar. 7, 2011, now Pat. No. 8,453,048.

(51) Int. Cl.
*G06F 17/00* (2006.01)
*G06F 17/24* (2006.01)
*G06F 17/22* (2006.01)

(52) U.S. Cl.
CPC .......... *G06F 17/24* (2013.01); *G06F 17/2235* (2013.01); *G06F 17/2288* (2013.01)

(58) Field of Classification Search
CPC .......................... G06F 17/2288; G06F 17/2235
See application file for complete search history.

(56) References Cited

U.S. PATENT DOCUMENTS

| | | | |
|---|---|---|---|
| 5,680,558 A | 10/1997 | Hatanaka et al. | |
| 6,012,073 A | 1/2000 | Arend et al. | |
| 6,742,015 B1 | 5/2004 | Bowman-Amuah | |
| 6,910,049 B2 | 6/2005 | Fenton et al. | |
| 6,964,009 B2 | 11/2005 | Samaniego et al. | |
| 7,028,221 B2 | 4/2006 | Holland et al. | |
| 7,240,077 B1 * | 7/2007 | Edelman | G06F 17/3089 |

(Continued)

OTHER PUBLICATIONS

"Features—Website Content Staging", Retrieved from: <http://www.asbrusoft.com/page.jsp/id=811> Jan. 3, 2011, 4 pages.

(Continued)

*Primary Examiner* — Laurie Ries

(57) ABSTRACT

Various embodiments provide techniques for time-based viewing of electronic documents. Examples of electronic documents include websites, webpages, text documents, web-based documents, and so on. In at least some embodiments, a time-based viewer is provided that enables a user to select a particular date and/or time for which to view an electronic document. The user can then navigate through the electronic document and view how the document will appear or did appear at the selected date and/or time. In at least some embodiments, a page container is provided that can include definitions for different versions of a page of an electronic document. According to some embodiments, the different versions of the page can correspond to different publication dates for the page. In some implementations, the time-based viewer can access a page container to retrieve a particular version of a page for display.

20 Claims, 8 Drawing Sheets

(56) References Cited

U.S. PATENT DOCUMENTS

| | | | |
|---|---|---|---|
| 7,325,192 B1* | 1/2008 | Bialek | G06F 17/3089 |
| | | | 707/E17.116 |
| 7,373,594 B1 | 5/2008 | Lopez et al. | |
| 7,472,341 B2* | 12/2008 | Albornoz | G06Q 10/10 |
| | | | 715/229 |
| 7,543,005 B1 | 6/2009 | Edelman et al. | |
| 7,761,591 B2* | 7/2010 | Graham | G06Q 40/02 |
| | | | 709/204 |
| 7,783,972 B2* | 8/2010 | Camps | G06F 17/24 |
| | | | 715/229 |
| 7,823,086 B2 | 10/2010 | Perantatos et al. | |
| 8,086,952 B2* | 12/2011 | Edd | G06F 17/3089 |
| | | | 715/229 |
| 8,352,852 B2* | 1/2013 | Heute | G06F 17/2288 |
| | | | 715/229 |
| 8,453,048 B2 | 5/2013 | Holt | |
| 2005/0262439 A1* | 11/2005 | Cameron | G06F 17/30076 |
| | | | 715/239 |
| 2007/0006126 A1 | 1/2007 | Calkins et al. | |
| 2007/0094248 A1* | 4/2007 | McVeigh | G06F 17/3089 |
| 2007/0136113 A1 | 6/2007 | Wilson | |
| 2007/0156726 A1 | 7/2007 | Levy | |
| 2007/0192156 A1 | 8/2007 | Gauger | |
| 2008/0002220 A1* | 1/2008 | Song | H04N 1/00222 |
| | | | 358/1.15 |
| 2008/0072290 A1 | 3/2008 | Metzer et al. | |
| 2008/0097777 A1* | 4/2008 | Rielo | G06Q 30/0281 |
| | | | 705/346 |
| 2008/0235594 A1 | 9/2008 | Bhumkar et al. | |
| 2009/0083314 A1* | 3/2009 | Maim | G06F 17/2288 |
| 2009/0157608 A1* | 6/2009 | Strathearn | G06F 17/30719 |
| 2009/0216763 A1* | 8/2009 | Dexter | G06F 17/30941 |
| 2010/0100899 A1 | 4/2010 | Bradbury et al. | |
| 2010/0107062 A1* | 4/2010 | Bacus | G06F 17/212 |
| | | | 715/269 |
| 2012/0069131 A1 | 3/2012 | Abelow | |
| 2012/0233528 A1 | 9/2012 | Holt | |

OTHER PUBLICATIONS

"Non-Final Office Action", U.S. Appl. No. 13/042,324, (Aug. 28, 2012),12 pages.

"Notice of Allowance", U.S. Appl. No. 13/042,324, (Jan. 25, 2013), 7 pages.

"Supplemental Notice of Allowance", U.S. Appl. No. 13/042,324, (Mar. 18, 2013), 5 pages.

"Using Web Content Management (WCM)", Retrieved from: <http://www.alfresco.com/help/webclient/concepts/cuh-wcm-intro.html> Jan. 3, 2011, 3 pages.

Barker, Deane "What is a Content Management System?", Retrieved from: <http://knol.google.com/k/what-is-a-content-management-system> on Jan. 3, 2011, (2009), 11 pages.

Little, Jason "Scheduling content to be published in the future", Retrieved from: <http://help.q4websystems.com/entries/39177-scheduling-content-to-be-published-in-the-future> Jan. 3, 2011, (Jun. 2, 2009), 1 page.

* cited by examiner

TIME-BASED VIEWING OF ELECTRONIC DOCUMENTS

PRIORITY

This application is a continuation of and claims priority under 35 U.S.C. §120 to U.S. patent application Ser. No. 13/042,324, filed Mar. 7, 2011, and titled "TIME-BASED VIEWING OF ELECTRONIC DOCUMENTS," the disclosure of which is incorporated by reference herein in its entirety.

BACKGROUND

Many types of electronic documents undergo occasional revisions. Additionally, different pages of an electronic document can be revised for publication at different times. For example, different webpages included as part of a website can be updated with new content and published at different times. When preparing pages of an electronic document for future publication, a user may want to view the page in context, e.g., as the page will appear in the context of other pages of the electronic document at the time of publication. Many content editors simply allow a user to view a page being edited in isolation without providing an indication as to how the page will appear in the context of other linked pages (e.g., webpages) at a future publication date.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide techniques for time-based viewing of electronic documents. Examples of electronic documents include websites, webpages, text documents, web-based documents, and so on. In at least some embodiments, a time-based viewer is provided that enables a user to select a particular date and/or time for which to view an electronic document. The user can then navigate through the electronic document and view how the document will appear or did appear at the selected date and/or time. In the context of a website, the time-based viewer can enable a user to navigate through webpages of the website as they will appear at a future publication date or did appear at a past publication date. In at least some embodiments, the time-based viewer allows multiple versions of an electronic document that correspond to different publication dates to be viewed.

Further to some embodiments, a page container is provided that can include definitions for different versions of a page of an electronic document. For example, a particular page container can be associated with a webpage, and the page container can include different versions of the webpage. According to some embodiments, different versions of a page can correspond to different publication dates for the page. In some implementations, the time-based viewer can access a page container to retrieve a particular version of a page for display.

BRIEF DESCRIPTION OF THE DRAWINGS

The same numbers are used throughout the drawings to reference like features.

DETAILED DESCRIPTION

Overview

Various embodiments provide techniques for time-based viewing of electronic documents. Examples of an electronic document (hereinafter "document") include a website, a webpage, a text document, a web-based document, and so on. In at least some embodiments, a time-based viewer is provided that enables a user to select a particular date and/or time for which to view a document. The user can then navigate through the document and view how the document will appear or did appear at the selected date and/or time. In the context of a website, the time-based viewer can enable a user to navigate through webpages of the website as they will appear at a future publication date or did appear at a past publication date. In at least some embodiments, the time-based viewer allows multiple versions of a document that correspond to different publication dates to be viewed.

Further to some embodiments, a page container is provided that can include definitions for different versions of a page of an electronic document. For example, a particular page container can be associated with a webpage, and the page container can include different versions of the webpage. According to some embodiments, different versions of a page can correspond to different publication dates for the page. In some implementations, the time-based viewer can access a page container to retrieve a particular version of a page for display.

In the discussion that follows, a section entitled "Operating Environment" is provided and describes one environment in which one or more embodiments can be employed. Following this, a section entitled "Example Page Container" describes an example page container in accordance with one or more embodiments. Next, a section entitled "Example User Interfaces" describes example user interfaces in accordance with one or more embodiments. Following this, a section entitled "Example Preview Scenario" describes an example document preview scenario in accordance with one or more embodiments. Next, a section entitled "Example Methods" describes example methods in accordance with one or more embodiments. Last, a section entitled "Example System" describes an example system that can be utilized to implement one or more embodiments.

Operating Environment

Figure 1:
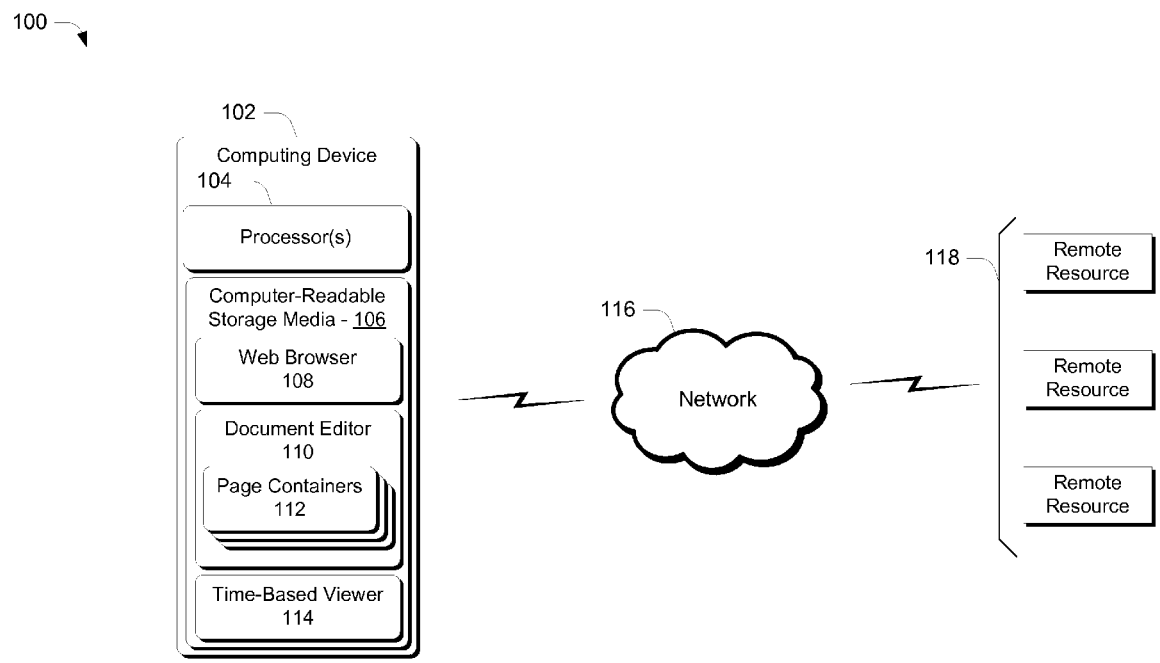
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104 and one or more computer-readable storage media 106. The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 8.

In addition, computing device 102 includes an application in the form of a web browser 108 that can be utilized via the computing device to access content such as a document, e.g., a webpage. The computing device 102 also includes a document editor 110 and one or more page containers 112. In at least some embodiments, the document editor is configured to enable documents such as webpages to be edited and published online. The page containers 112 are associated with pages of documents and in some embodiments enable different versions of a page to be created and maintained. A more detailed discussion of the page containers 112 is provided below.

Computing device 102 also includes a time-based viewer 114 that is configured to enable versions of a document and/or pages of the document to be viewed based on a particular date. For example, a user can indicate a future date and the time-based viewer can retrieve pages of a document that correspond to the date. In at least some embodiments, this can enable multiple versions of a document to be created for different publication dates (e.g., by the document editor 110) and can enable the multiple versions to be previewed prior to publication. In the context of a website, multiple different versions of a webpage associated with the website can be created and each version can correspond to a different publication date. The time-based viewer 114 can retrieve one of the versions of the webpage based on a particular publication date and can enable navigation through the website based on how pages of the website will appear or did appear at the publication date.

In addition, environment 100 includes a network 116, such as the Internet, and one or more remote resources 118 with which the computing device 102 can communicate. Examples of the remote resources 118 include a remote web server, a cloud computing resource, and so on. In some example embodiments, the computing device 102 can retrieve documents from the remote resources 118.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of an example page container in accordance with one or more embodiments.

Example Page Container

Figure 2:
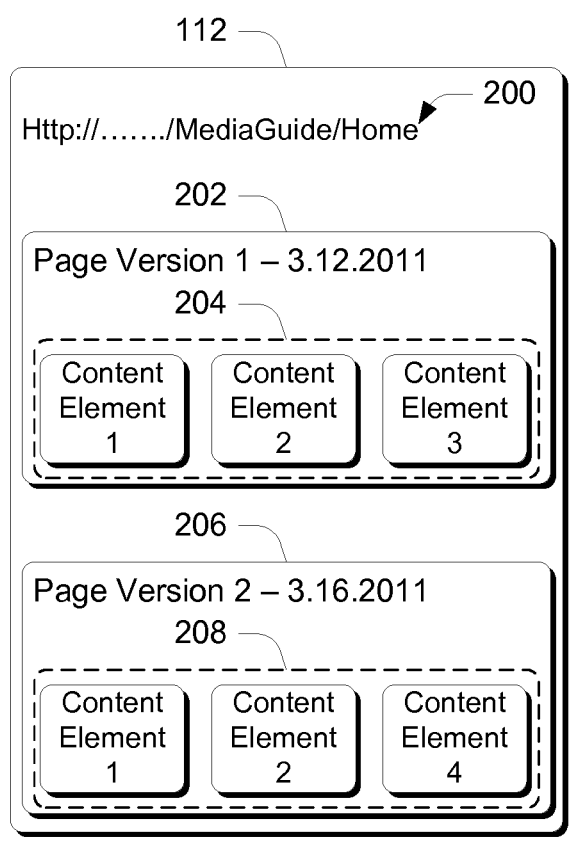
FIG. 2 illustrates an example page container in accordance with one or more embodiments.

FIG. 2 illustrates one of the page containers 112 in more detail in accordance with one or more embodiments. As discussed above, in at least some embodiments the page container 112 can include information about a page and/or a portion of a document. In this particular example, the page container 112 includes an address 200 that can be used to label and/or retrieve the page container. Examples of the address 200 include a uniform resource locator (URL), a uniform resource identifier (URI), a network address, and so on.

The page container 112 also includes a page version 202 that includes content elements 204. According to one or more embodiments, the page version 202 can include information about a particular version of a page, such as a version number, a publication date, documents with which the page version is associated, other pages with which the page version is associated, and so on. The content elements 204 include information about content for the page version 202. For example, the content elements 204 can include instances of and/or references to text content, images, video, audio, and so on. In the context of a webpage, a particular content element can include content for a portion of the webpage.

Also included as part of the page container 112 is a page version 206 which in turn includes content elements 208. In at least some embodiments, the page version 206 represents a version of a portion of a document that is different in one or more respects than a version represented by the page version 202. For example, content included as part of the content elements 208 can differ from the content included as part of the content elements 204. In at least some embodiments, different page versions (e.g., the page version 204 and the page version 208) can enable different versions of a page to be created and used for publication at different times.

While not expressly illustrated here, in at least some embodiments a page version can include references to other pages and/or documents. A reference to different page can be date-specific and thus can be used to retrieve a version of the different page that corresponds to a particular date, e.g., the publication date of the page version. For example, in the context of a website, a page version can represent a webpage and the page version can include a link or other reference to a different webpage of the website.

In at least some embodiments, the page version 202 and/or the page version 206 can each be associated with a particular workflow status. For example, a workflow status for a particular page version can indicate that the page version is approved, rejected, or is pending review. Thus, a page version can track a workflow status of the page version and changes to the workflow status can be stored as part of the page version.

Example User Interfaces

Figure 3:
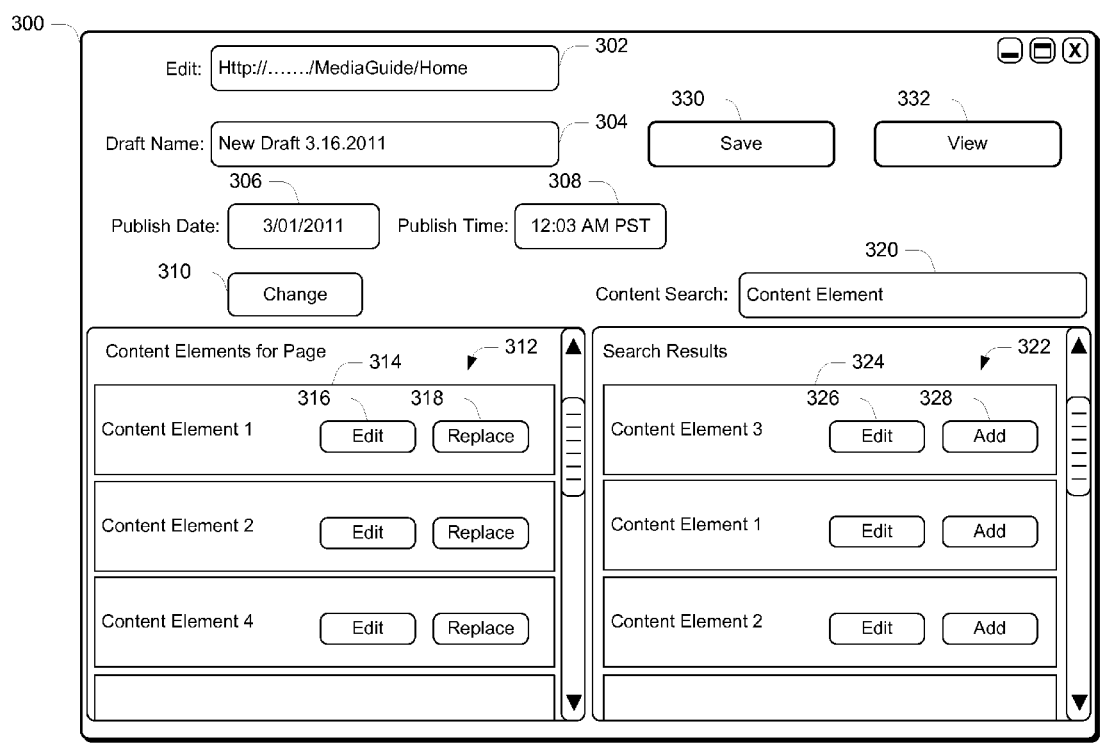
FIG. 3 illustrates an example user interface in accordance with one or more embodiments.

FIG. 3 illustrates an example user interface that can be used to edit documents, generally at 300. In at least some embodiments, the user interface 300 can be used to select content to be used to populate all and/or a portion of a document, such as a webpage.

The user interface 300 includes an address field 302 and a draft name field 304. In at least some embodiments, the address field 302 is configured to display an address for a page of a document that is being edited via the user interface 300. For example, a user can provide a URL or other address for a webpage to be edited via the user interface. In accordance with one or more embodiments, the draft name field 304 is configured to enable a user to provide a name for a page of an electronic document that is being edited. For example, the name can correspond to a particular version of a page that is being edited via the user interface 300.

Also included as part of the user interface 300 is a publish date field 306 and a publish time field 308. In at least some embodiments, the publish date field 306 and the publish time field 308 enable a user to indicate a date and time on which a page being edited is to be published. For example, a date and time can be indicated for a webpage that is to be published as part of a website. A change button 310 can be actuated to present a calendar or other instrumentality (not illustrated) that can be used to select a date and/or time for publication of a page.

The user interface 300 further includes a content region 312 that is configured to be populated with indications of content to be used for a particular page. In this particular example, the content region 312 includes several content elements, e.g., from the content elements 204 and/or 208, discussed above in reference to FIG. 2. As part of the content elements is a content element 314 that includes and/or references a particular instance of content to be used to populate a page.

The content element 314 includes an edit button 316 and a replace button 318. The edit button 316 can be pressed to enable the content element 314 to be edited. For example, pressing the edit button 316 can enable content to be added to or deleted from the content element 314. The replace button 318 can be pressed to enable the content element 314 to be replaced with a different content element.

Also included as part of the user interface 300 is a search field 320 and a search results region 322. In at least some embodiments, the search field 320 can be used to enter search terms to be used to search for content (e.g., content elements) to be used to populate a page. For example, a user can enter a search term in the search field 320 and the results of the search can be displayed in the search results region 322. In this particular example, the search results region 322 includes a content element 324 that includes an edit button 326 and an add button 328. In at least some embodiments, the edit button 326 can be pressed to edit content associated with the content element 324. The add button 328 can be pressed to cause the content element 324 to be added to a page being edited, e.g., to the content region 312.

The user interface 300 further includes a save button 330 and a view button 332. In at least some embodiments, the save button 330 can be pressed to cause edits to a page to be saved. For example, the content elements included as part of the content region 312 can be saved for a particular page and/or page version. The view button 332 can be pressed to enable a visual view of a page being edited via the user interface 300 to be displayed. For example, pressing the view button 332 can cause a preview of a webpage that includes content from the content region 312 to be displayed.

Figure 4:
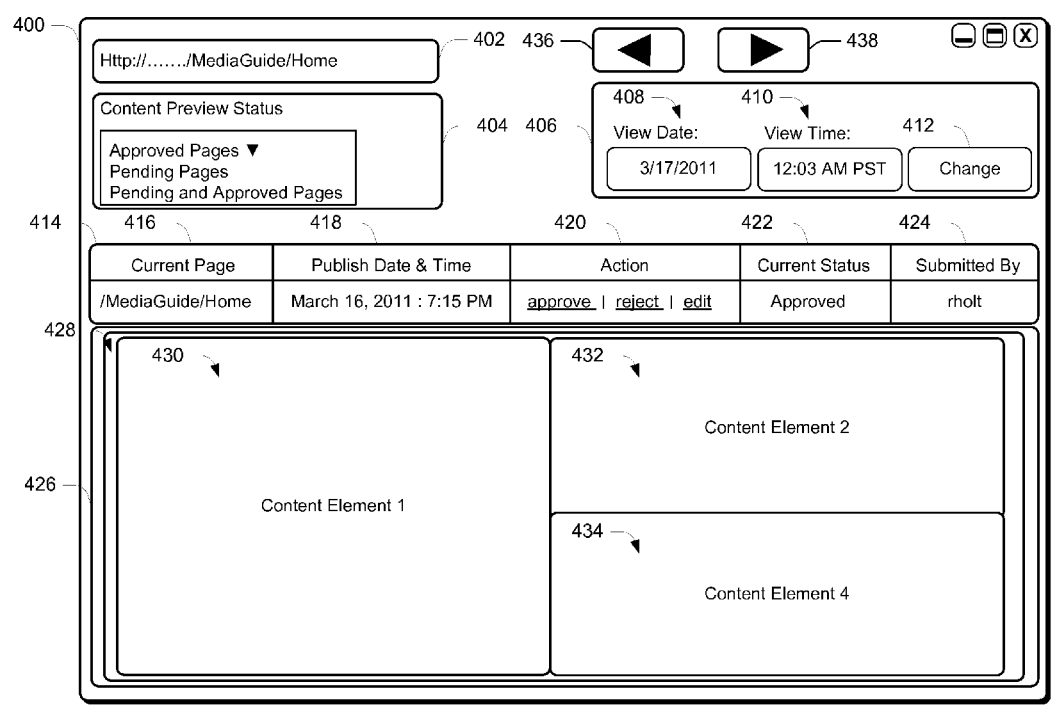
FIG. 4 illustrates an example user interface in accordance with one or more embodiments.

FIG. 4 illustrates an example user interface that can be used to view documents, generally at 400. In at least some embodiments, the user interface 400 can be used to view versions of documents and/or versions of pages of documents based on a particular publication date and/or time. For example, the user interface 400 can be displayed responsive to the view button 332 of the user interface 300 (discussed above) being pressed.

Included as part of the user interface 400 is an address field 402 that can be populated with an address to a page that is being viewed via the user interface 400. For example, a user can enter an address into the address field 402 to cause a particular document and/or page of a document to be accessed via the user interface 400. The user interface 400 also includes a status field 404 that enables a workflow status to be selected for viewing a document. For example, a user can indicate a workflow status of "approved pages", "pending pages", or "pending and approved pages" to be used to filter and retrieve pages of a document.

Further included as part of the user interface 400 is a viewing parameters region 406 which includes a view date field 408, a view time field 410, and a change button 412. In at least some embodiments, the view date field 408 and the view time field 410 indicate a view date and view time for a page that is displayed via the user interface 400. For example, a user can enter a date into the view date field 408 and a time into the view time field 410. This date and time can then be used to retrieve and display a version of a page of a document (e.g., as indicated in the address field 402) that will be published at that date and time. In at least some embodiments, the date and time can be used to retrieve previously published pages and/or pages that are scheduled for future publication. According to some embodiments, the change button 412 can be pressed to enable the date and/or time to be changed.

Also included as part of the user interface 400 is a page data region 414 that includes information about a page being viewed via the user interface 400 and actions that can be performed that affect the page. For example, the page data region 414 includes a page address field 416, a publish date field 418, an action field 420, a status field 422, and a personnel field 424. In this particular example, the page address field 416 includes a page address for a page that is displayed via the user interface 400. The publish date field 418 includes a date and/or time of publication for a page being displayed. In at least some embodiments, the date and/or time of publication can refer to a planned future publication date, a current publication date, or a past publication date.

According to at least some embodiments, the action field 420 includes various actions that can be performed with respect to a page being viewed via the user interface 400. In this particular example, the action field 420 includes several selectable functions, such as an "approve" function, a "reject" function, and an "edit" function. In at least some embodiments, the approve function can be selected to cause a page being viewed via the user interface 400 to be approved as part of a workflow, the reject function can be selected to cause the page to be rejected, and the edit function can be selected to enable the page to be edited. In some example implementations, selecting the edit function can cause the user interface 300 (discussed above with reference to FIG. 3) to be displayed such that the page can be edited via the user interface 300.

In at least some embodiments, the status field 422 indicates a workflow status of a page (e.g., approved, pending, rejected, and so on) and the personnel field 424 indicates personnel associated with the page.

The user interface 400 also includes a content region 426 that is configured to display various types of content, such as a page of a document. In this particular example, the content region 426 displays a page 428 that includes content elements 430, 432, and 434. In at least some embodiments, the page 428 corresponds to a version of a page that is retrieved based on information indicated by the various fields of the user interface 400, such as the address field 402, the status field 404, and the parameters region 406.

Also included as part of the user interface 400 is a back button 436 and a forward button 438. In at least some embodiments, the back button and the forward button can be used to navigate through content, e.g., through pages of a document displayed via the content region 426.

In an example implementation scenario, the user interface 400 can be used to preview pages of a document based on a future publication date. For example, a future date and/or time can be entered via the view date field 408 and/or the view time field 410. A page version can then be retrieved (e.g., one of page versions 202 or 206 discussed above) based on the date and/or time and displayed via the content region 426. A user can then navigate between the different pages of the document to view a version of the document that is scheduled to be published at the particular date and/or time.

Example Preview Scenario

Figure 5:
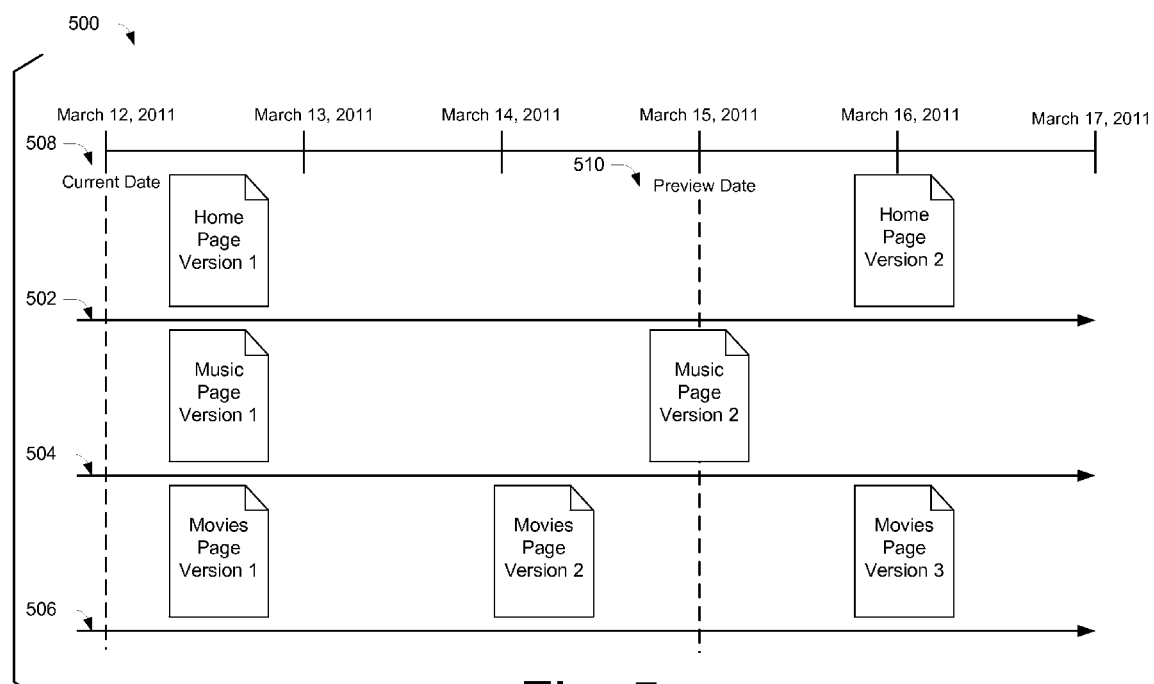
FIG. 5 illustrates an example document preview scenario in accordance with one or more embodiments.

FIG. 5 illustrates an example document preview scenario, generally at 500. The document preview scenario 500 includes representations of several versions of pages of a document, e.g., a home page, a music page, and a movies page. In at least some embodiments, these pages correspond to webpages of a website. Also included as part the document preview scenario are a home page timeline 502, a music page timeline 504, and a movies page timeline 506. According to one or more embodiments, each of the timelines corresponds to a publication timeline for a respective page.

The document preview scenario further includes a current date 508 and a preview date 510. The current date 508 indicates a date on which the pages of the document are being previewed and the preview date 510 indicates a date to be used to retrieve versions of the pages. In at least some embodiments, the document preview scenario can be implemented via the user interface 400 discussed above with reference to FIG. 4. For example, the preview date 510 can be provided to the view date field 408 to be used to retrieve and display pages of a document.

In this particular example scenario, a user can navigate between the different pages of the document (e.g., via the user interface 400) and view versions of the pages that are published as of the preview date 510. For example, the user can view the "Home Page Version 1", the "Music Page Version 2", and the "Movies Page Version 2". According to at least some embodiments, the versions correspond to page versions included as part of a page container, e.g., the page container 112. In at least some embodiments, the preview date 510 can be moved forward and backward along the various timelines to view different versions of the pages.

Example Methods

Figure 6:
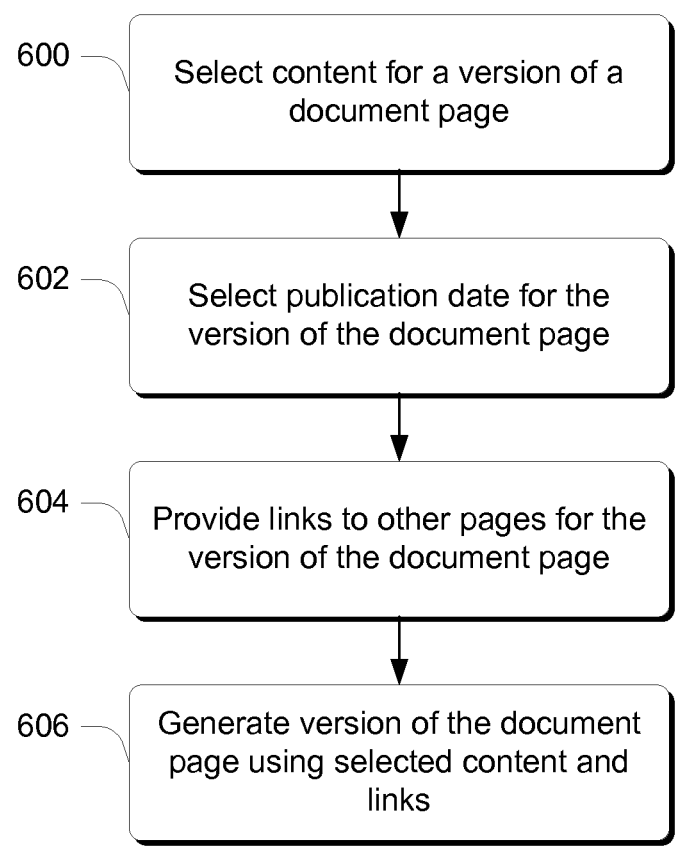
FIG. 6 illustrates an example method in accordance with one or more embodiments.

FIG. 6 is a flow diagram that describes a method in accordance with one or more embodiments. The method can be implemented in connection with any suitable hardware, software, firmware, or combination thereof. In at least some embodiments, the method can be implemented via the document editor 110 and/or the time-based viewer 114, discussed above with reference to environment 100.

At 600, selection of content for a version of a document page is received. For example, the content can be selected via the user interface 300 discussed above. In at least some embodiments, the version of the document page can be included as part of the page container 112.

At 602, selection of a publication date for the version of the document page is received. For example, with reference to user interface 300, the publish date field 306 and/or the publish time field 308 can be used to indicate a publish date and/or time for the version.

At 604, links are provided to other pages for the version of the document page. For example, the links can include links (e.g., hyperlinks) to versions of other pages that are scheduled to be published at the publication date for the page version. In at least some embodiments, the other pages can include other pages of the document and/or pages of other documents.

At 606, the version of the document page is generated using the selected content and the links. For example, the page version can be generated as part of the page container 114. In at least some embodiments, the page version can be previewed, e.g., via the user interface 400.

Figure 7:
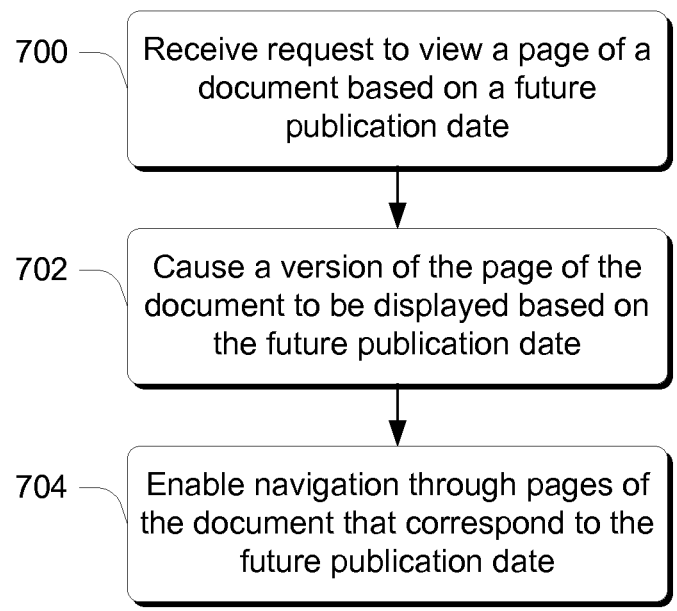
FIG. 7 illustrates an example method in accordance with one or more embodiments.

FIG. 7 is a flow diagram that describes a method in accordance with one or more embodiments. The method can be implemented in connection with any suitable hardware, software, firmware, or combination thereof. In at least some embodiments, the method can be implemented via the time-based viewer 114, discussed above with reference to environment 100.

At 700, a request to view a document based on a future publication date is received. In at least some embodiments, the request to view the document can be made via the user interface 400, discussed above with reference to FIG. 4.

At 702, a version of the document is displayed based on the future publication date. For example, a page of the document with a publication date that corresponds to the requested date can be displayed.

At 704, navigation through pages of the version of the document that correspond to the future publication date is enabled. For example, the user interface 400 can be used to navigate through pages of the document with publication dates that correspond to the particular date.

Having described methods in accordance with one more embodiments, consider now an example system that can be utilized to implement one or more embodiments.

Example System

Figure 8:
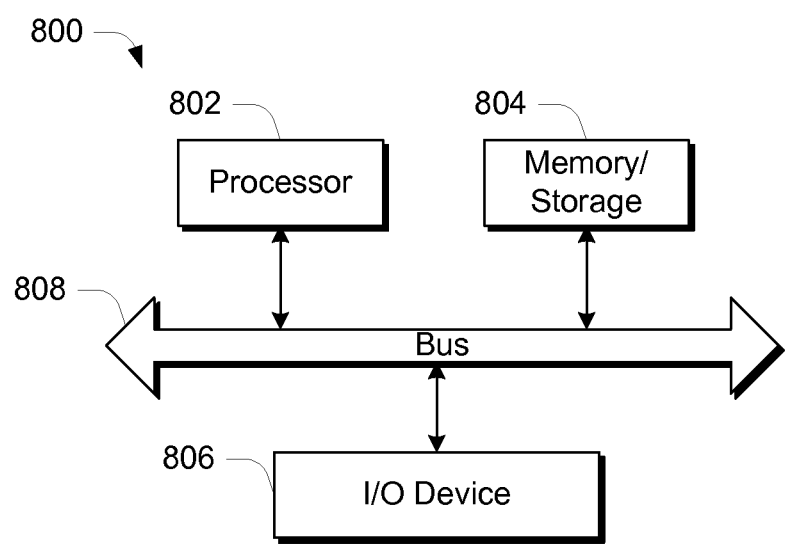
FIG. 8 illustrates an example system that can be used to implement one or more embodiments.

FIG. 8 illustrates an example computing device 800 that can be used to implement the various embodiments described above. Computing device 800 can be, for example, computing device 102 and/or one or more of remote resources 118 of FIG. 1.

Computing device 800 includes one or more processors or processing units 802, one or more memory and/or storage components 804, one or more input/output (I/O) devices 806, and a bus 808 that allows the various components and devices to communicate with one another. Bus 808 represents one or more of any of several types of bus structures, including a memory bus or memory controller, a peripheral bus, an accelerated graphics port, and a processor or local bus using any of a variety of bus architectures. Bus 808 can include wired and/or wireless buses.

Memory/storage component 804 represents one or more computer storage media. Component 804 can include volatile media (such as random access memory (RAM)) and/or nonvolatile media (such as read only memory (ROM), Flash memory, optical disks, magnetic disks, and so forth). Component 804 can include fixed media (e.g., RAM, ROM, a fixed hard drive, etc.) as well as removable media (e.g., a Flash memory drive, a removable hard drive, an optical disk, and so forth).

One or more input/output devices 806 allow a user to enter commands and information to computing device 800, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer-readable storage media do not include signals per se.

CONCLUSION

Various embodiments provide techniques for time-based viewing of electronic documents. Examples of electronic documents include websites, webpages, text documents, web-based documents, and so on. In at least some embodiments, a time-based viewer is provided that enables a user to select a particular date and/or time for which to view an electronic document. The user can then navigate through the electronic document and view how the document will appear or did appear at the selected date and/or time. In at least some embodiments, a page container is provided that can include definitions for different versions of a page of an electronic document. According to some embodiments, the different versions of the page can correspond to different publication dates for the page. In some implementations, the time-based viewer can access a page container to retrieve a particular version of a page for display.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving an input to a search field in a graphical user interface (GUI);
   displaying a plurality of content elements as search results in a search results region of the GUI, the search results based on a search utilizing the input to the search field, one or more of the plurality of content elements displayed in the search results region comprising an edit button configured to allow a user, responsive to selecting the button, to edit a respective content element;
   receiving a selection of one of the content elements in the GUI;
   adding, via the GUI, an indication of the one of the content elements to a content region of the GUI configured to be populated with indications of content to be used for a page of an electronic document; and
   displaying, in the GUI, how the one of the content elements is currently configured to appear in the page of the electronic document at a selected future publication date and time.

2. The computer implemented method of claim 1, wherein the input comprises one or more search terms.

3. The computer implemented method of claim 1, further comprising editing, via the GUI, the one of the content elements after said adding, including changing content in the one of the content elements on the page.

4. The computer-implemented method of claim 1, further comprising:
   receiving an input to select an edit button of the one of the content elements; and
   editing, via the GUI, the one of the content elements prior to said adding.

5. The computer-implemented method of claim 4, wherein said editing comprises changing content associated with the one of the content elements in another page responsive to said editing.

6. The computer-implemented method of claim 1, further comprising receiving selection of the future publication date and time via a calendar tool.

7. The computer-implemented method of claim 1, further comprising receiving a user input to cause a preview of a webpage that displays how the one of the content elements will appear in the page of the electronic document.

8. The computer-implemented method of claim 1, further comprising displaying a workflow status of the electronic document in the GUI.

9. The computer-implemented method of claim 1, further comprising receiving an indication of a different publication date and time, and displaying a version of the page of the electronic document that corresponds to the different publication date and time.

10. One or more computer-readable storage media embodying computer-executable instructions, the computer-executable instructions being executable by a computing device to perform operations comprising:
    displaying a plurality of content elements as search results in a search results region of a graphical user interface (GUI), the search results based at least in part on one or more search terms provided as input to the GUI;
    receiving an edit, via the GUI, to one of the content elements in the search result to generate an edited content element;
    adding, via the GUI, an indication of the edited content element to a content region of the GUI configured to be populated with indications of content to be used for a page of an electronic document associated with a future publication date and time;
    displaying, via the GUI, the page of the electronic document including how the edited content element is currently configured to appear in the page of the electronic document at the future publication date and time; and
    storing the page including the edited content element for publication at the future publication date and time.

11. The one or more computer readable storage media of claim 10, further comprising receiving an edit, via the GUI, to the future publication date and time through a calendar tool.

12. The one or more computer readable storage media of claim 10, wherein said displaying the page comprises displaying a preview of the page as it will appear upon publication.

13. The one or more computer readable storage media of claim 10, further comprising receiving, via the GUI, further edits to the edited content element after said adding, including changing content in the edited content element on the page.

14. The one or more computer readable storage media of claim 10, wherein said editing comprises changing content associated with the edited content element in another page responsive to said editing.

15. The one or more computer readable storage media of claim 10, further comprising displaying a workflow status of the electronic document in the GUI.

16. The one or more computer readable storage media of claim 10, further comprising receiving an indication of a different publication date and time, and displaying a version of the page of the electronic document that corresponds to the different publication date and time.

17. A system comprising:
    at least one processor; and one or more computer-readable storage media including instructions stored thereon that, responsive to execution by the at least one processor, cause the system perform operations including:

receiving an input to a search field in a graphical user interface (GUI);

displaying a plurality of content elements as search results in a search results region of the GUI based on a search utilizing the input to the search field;

receiving a selection of one of the content elements in the GUI;

adding, via the GUI, an indication of the one of the content elements to a content region of the GUI configured to be populated with indications of content to be used for a page of an electronic document; and displaying, in the GUI, how the one of the content elements is currently configured to appear in the page of the electronic document at a selected future publication date and time.

18. The system of claim 17, wherein the input comprises one or more search terms.

19. The system of claim 17, further comprising editing, via the GUI, the one of the content elements prior to said adding.

20. The system of claim 17, further comprising selecting the future publication date and time using a calendar tool.

\* \* \* \* \*